United States Patent
Ito et al.

(10) Patent No.: US 6,995,968 B2
(45) Date of Patent: Feb. 7, 2006

(54) DIELECTRIC CERAMIC COMPOSITIONS AND ELECTRONIC DEVICES

(75) Inventors: Kazushige Ito, Chuo-ku (JP); Shunichi Yuri, Chuo-ku (JP); Yukie Nakano, Chuo-ku (JP); Mari Miyauchi, Chuo-ku (JP); Takako Hibi, Chuo-ku (JP); Daisuke Iwanaga, Chuo-ku (JP); Masakazu Hosono, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/951,941

(22) Filed: Sep. 29, 2004

(65) Prior Publication Data

US 2005/0111163 A1    May 26, 2005

(30) Foreign Application Priority Data

Sep. 30, 2003    (JP)    ............................ 2003-340577

(51) Int. Cl.
*H01G 4/06*    (2006.01)
(52) U.S. Cl. .................. 361/321.2; 361/311; 501/137; 501/138; 501/139
(58) Field of Classification Search ........ 361/311–313, 361/321.1–321.5, 322; 501/137–138
See application file for complete search history.

(56) References Cited

U.S. PATENT DOCUMENTS

| | | | | |
|---|---|---|---|---|
| 6,649,554 | B1 * | 11/2003 | Chang et al. ................ | 501/137 |
| 6,733,897 | B2 * | 5/2004 | Choi et al. .................. | 428/472 |
| 6,746,980 | B2 * | 6/2004 | Tokita et al. ................ | 501/137 |

FOREIGN PATENT DOCUMENTS

| JP | A-03-133116 | 6/1991 |
|---|---|---|
| JP | A-07-201645 | 8/1995 |
| JP | A-09-315861 | 12/1997 |
| JP | B2-2787746 | 6/1998 |
| JP | A-11-317322 | 11/1999 |
| JP | A-2001-230148 | 8/2001 |
| JP | A-2003-109430 | 4/2003 |

* cited by examiner

*Primary Examiner*—Anthony Dinkins
(74) *Attorney, Agent, or Firm*—Oliff & Berridge, PLC

(57) ABSTRACT

In order to provide dielectric ceramic composition having low IR defect rate and high relative dielectric constant even when the multilayer ceramic capacitor is made thinner, dielectric ceramic composition including a main component expressed by a composition formula $\{\{Ba_{(1-x)}Ca_x\}O\}_A\{Ti_{(1-y-z)}Zr_yMg_z\}_BO_2$ and subcomponents of Mn oxide, Y oxide, V oxide and Si oxide is provided. In the above formula, A, B, x, y and z are as follows: $0.995 \leq A/B \leq 1.020$, $0.0001 \leq x \leq 0.07$, preferably $0.001 \leq x < 0.05$, $0.1 \leq y \leq 0.3$ and $0.0005 \leq z \leq 0.01$, preferably $0.003 \leq z \leq 0.01$.

10 Claims, 4 Drawing Sheets

DIELECTRIC CERAMIC COMPOSITIONS AND ELECTRONIC DEVICES

BACKGROUND OF THE INVENTION

1. Field of the Invention

The present invention relates to dielectric ceramic compositions used such as dielectric layer of multilayer ceramic capacitor and electronic devices used as dielectric layer of the dielectric ceramic compositions.

2. Description of the Related Art

Multilayer ceramic capacitor is broadly used as small size, large capacity and highly reliable electronic device and that a large number of the multilayer ceramic capacitors is used in electric equipments and electronic equipments. Recently, as equipments get smaller in size and higher in performance, demands for smaller size, larger capacity, lower cost and higher reliability for the multilayer ceramic capacitor are becoming more strict.

Multilayer ceramic capacitors are normally manufactured by laminating the internal electrode layer paste and dielectric slurry (paste) by sheet method or printing method and firing them. For the internal electrode past, normally Pd or Pd alloys have been used, however, instead of the costly Pd, relatively low priced Ni or Ni alloys are being used.

Now when forming internal electrodes by Ni or Ni alloys, firing in an atmosphere leads to the oxidation of the electrodes. Therefore, generally, after debinder, it is required to fire in reducing or neutral atmosphere.

But multilayer ceramic capacitor having the internal electrode made of Ni or Ni alloys, in comparison to the internal electrode made of Pd manufactured by firing in an atmosphere, had problems of being shorter life for insulation resistance and being unreliable.

The dielectric ceramic compositions of multilayer ceramic capacitors disclosed in The Patent Article 1; Japanese Unexamined Patent Publication 3-133116 and The Patent Article 2; Japanese Patent Publication 2787746 are known to lengthen the insulation resistance life at the dielectric ceramic composition of multilayer ceramic capacitor having internal electrode made of Ni or Ni alloys.

According to The Patent Article 1, by using dielectric ceramic composition containing dielectric oxide having a certain composition and including a predetermined amount of one or more kinds selected from compounds that are oxides of Y, Gd, Th, Dy, Zr, V, Mo, Zn, Cd, Tl, Sn, and P and/or the oxides of those by firing, the insulation resistance life can be lengthened.

According to The Patent Article 2, by using dielectric ceramic composition containing dielectric oxide having a certain composition and including a compound which a certain amount of Mn oxides and/or the Mn oxides by firing, and a compound which a certain amount of Y oxides and/or the Y oxides by firing, the insulation resistance life can be further lengthened.

Further, according to the dielectric ceramic compositions as in the Patent Articles 1 and 2, main composition $\{\{Ba_{(1-x-y)}Ca_xSr_y\}O\}_A\{Ti_{(1-z)}Zr_z\}_BO_2$ may be added with Mg oxides as subcomponent. However, these articles do not disclose the composition amount rate of Mg and Ca to lower the initial insulation resistance percent defective, namely the IR defect rate. Further, dielectric ceramic composition as in Patent Article 1 has a problem that since it includes much Ca, relative dielectric constant becomes lower.

SUMMARY OF THE INVENTION

The purpose of this invention is to provide a dielectric ceramic composition which is used for dielectric layer of multilayer ceramic capacitor and even when the multilayer ceramic capacitor is made thinner, IR defect rate can be lowered and high relative dielectric constant can be obtained.

Further, another object of the present invention is to provide an electronic device such as multilayer ceramic capacitor which is manufactured by using dielectric ceramic composition to heighten the reliability. Particularly the object of the present invention is to provide an electronic device such as multilayer ceramic capacitor which can keep up with a tendency to be thin and small.

Inventors of the present invention have considered in detail of dielectric ceramic composition used as dielectric layer of electronic device such as multilayer ceramic capacitor in which used as dielectric layer of multilayer ceramic capacitor and even when the thickness of multilayer ceramic capacitor is made thinner, IR defect rate can be suppressed low and high relative dielectric ceramic constant can be obtained. As a result, it was found that dielectric ceramic composition composed of main component and subcomponent, wherein the main component includes Mg atom, dielectric material expresses a composition formula $\{\{Ba_{(1-x)}Ca_x\}O\}_A\{Ti_{(1-y-z)}Zr_yMg_z\}_BO_2$ and the composition ratio of main component is limited, can obtain the object of the present invention to complete the invention.

That is, dielectric ceramic composition of the present invention includes main component expressed by a composition formula $\{\{Ba_{(1-x)}Ca_x\}O\}_A\{Ti_{(1-y-z)}Zr_yMg_z\}_BO_2$, wherein A, B, x, y and z are as follows: $0.995 \leq A/B \leq 1.020$, $0.0001 \leq x \leq 0.07$, $0.1 \leq y \leq 0.3$ and $0.0005 \leq z \leq 0.01$ and as subcomponent, with respect to 100 mol of the main component, 0.03 to 1.7 mol of Mn oxide converted to MnO, 0.05 to 0.5 mol of Y oxide converted to $Y_2O_3$, 0.007 to 0.4 mol of V oxide converted to $V_2O_5$ and 0 to 0.5 mol of Si oxide converted to $SiO_2$.

Dielectric ceramic composition of present invention preferably further includes 0.005 to 0.3 mol of W oxide converted to $WO_3$ as subcomponent with respect to 100 mol of the main component.

Electronic device according to the present invention includes dielecric layer manufactured by any of dielectric ceramic composition mentioned above. The electronic device is not particularly limited, but multilayer ceramic capacitor, piezoelectric element, chip inductor, chip varistor, chip thermistor, chip resistance and the other surface-mount (SMD) chip type electronic device can be exemplified.

The multilayer ceramic capacitor of the present invention includes capacitor element body which dielectric layer and inner electrode layer are stacked alternately wherein said dielectric layer is composed of abovementioned dielectric ceramic composition.

According to the multilayer ceramic capacitor of the present invention, conductive material included in said inner electrode layer is preferably Ni or Ni alloys.

According to the multilayer ceramic capacitor of the present invention, preferably the number of laminated layer of said dielectric layer is 50 or more.

According to the multilayer ceramic capacitor of the present invention, preferably the thickness of said dielectric layer is 4.5 μm or less.

According to the multilayer ceramic capacitor of the present invention, preferably ratio (R/d) of average particle size (R) of dielectric particles composing said dielectric layer and thickness (d) of said dielectric layer is 0.5<R/d<3.

According to the multilayer ceramic capacitor of the present invention, cover rate which shows the ratio of said inner electrode layer covering said dielectric layer is preferably 60 to 100%.

According to the present invention, even when dielectric layer of multilayer ceramic capacitor is made thinner and laminated in multiple numbers, dielectric ceramic composition having low IR defect rate and high relative dielectric constant can be obtained. Further, according to the present invention, even when dielectric layer of multilayer ceramic capacitor is made thinner, the electric device such as multilayer ceramic capacitor having low IR defect rate and high relative dielectric constant can be provided.

BRIEF DESCRIPTION OF THE DRAWINGS

Below are descriptions of the present invention based on preferred embodiments given with reference to the drawings which

DESCRIPTION OF THE PREFERRED EMBODIMENTS

Figure 1:
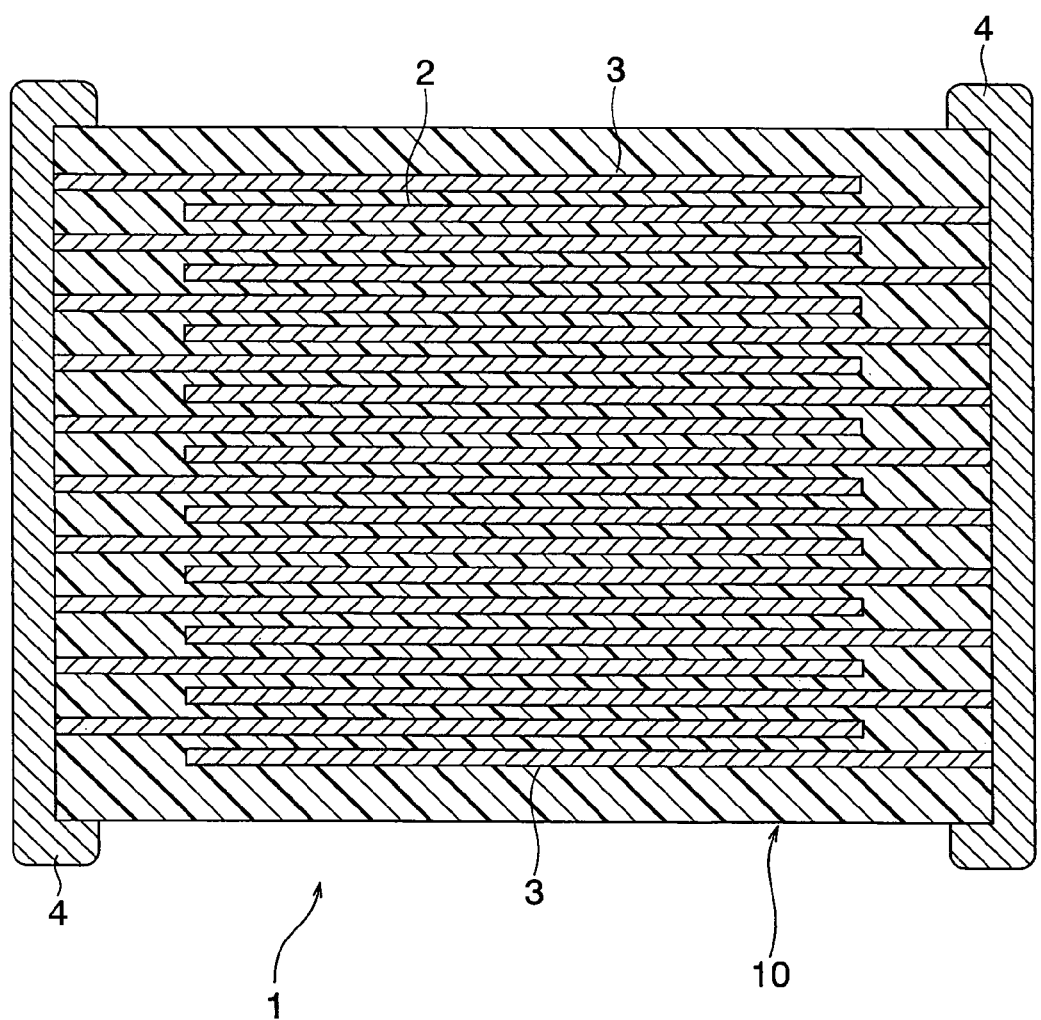
FIG. 1 is a cross-sectional view of multilayer ceramic capacitor according to an embodiment of the present invention.

As shown in FIG. 1, a multilayer ceramic capacitor 1 according to an embodiment of the present invention comprises a capacitor element body 10 having the configuration wherein dielectric layers 2 and internal electrode layers 3 are alternately stacked. At both ends of the capacitor element body 10 are formed a pair of external electrodes 4 respectively connected to the internal electrode layers 3 alternately arranged inside the element body 10. A shape of the capacitor element body 10 is not particularly limited, but is normally made in parallelpiped shape. Further, the capacitor dimensions are also not limited and may be made with suitable dimensions for the use.

The internal electrode layers 3 are stacked so that the end faces thereof alternately protrude out to the surfaces of the two opposing ends of the capacitor element body 10. The pair of external electrodes 4 are formed at the two ends of the capacitor element body 10 and are connected to the exposed end faces of the alternately arranged internal electrode layers 3 so as to compose the capacitor circuit.

The dielectric layers 2 include a dielectric ceramic composition of the present invention.

Dielectric ceramic composition of the present invention include main component having dielectric oxide expressed by a composition formula $\{\{Ba_{(1-x)}Ca_x\}O\}_A\{Ti_{(1-y-z)}Zr_yMg_z\}_BO_2$ and, as subcomponent, Mn oxide, Y oxide, V oxide and Si oxide. Under the circumstances, the content of oxide (O) can be varied a little from the above stoichiometry composition.

x in the above formula is 0.0001 or more and 0.07 or less, preferably 0.0001 or more and less than 0.05.

y in the above formula is 0.1 or more and 0.3 or less, preferably 0.15 or more and 0.20 or less.

z in the above formula is 0.0005 or more and 0.01 or less, preferably 0.003 or more and 0.01 or less.

Further, A/B in the above formula is 0.995 or more and 1.020 or less, preferably 1.000 or more and 1.015 or less.

In the above formula, x is the ratio of Ca and z is the ratio of Mg. And the characteristics of dielectric ceramic formula of the present invention is the inclusion of Mg atom in main component and further, the content of x and z, namely, the ratio of Ca and Mg in the above formula is within the range of the above prescribed ratio. That is, by including Mg atom in the main component and fixing the ratio of Ca and Mg within the range of the above predetermined ratio, even when the thickness of ceramic capacitor is made thinner, IR defect rate can be lowered and relative dielectric constant can be hightened.

Ca is a functioning atom which mainly improves the firing stability and also insulation resistance value. When the content of x showing the ratio of Ca is less than 0.0001, abnormal growth of particles in dielectric layer tends to grow when firing and when the content of x exceeds 0.07, relative dielectric ratio tends to become lower. Accordingly, the content of x is preferably within the range of $0.0001 \leq x \leq 0.07$, from the point of improving relative dielectric constant, it is preferably $0.0001 \leq x \leq 0.05$.

Mg is a functioning atom which decreases the IR defect rate. When the content of z showing the ratio of Mg is less than 0.0005, IR defect rate tends to increase and when z exceeds 0.01, relative dielectric ratio tends to decrease. Accordingly, the content of z is preferably within the range of $0.0005 \leq z \leq 0.01$.

In the above composition formula, y is the ratio of Zr. The Zr mainly functions as a shifter which moves Curie point to lower temperature. When y is less than 0.1, dielectric loss tends to be higher and when y exceeds 0.3, relative dielectric constant tends to be lower. Accordingly, the content of y is preferably within the range of $0.1 \leq y \leq 0.3$.

In the above composition formula, when A/B is less than 0.995, abnormal growth of particles in dielectric layer tends to grow when firing and also insulation resistance value tends to decrease. And when A/B exceeds 1.020, sintering character tends to deteriorate and it will be difficult to densify the sintering body. Accordingly, A/B is preferably within the range of $0.995 \leq A/B \leq 1.020$.

Mn oxide has effects to promote sintering, highten IR and improve IR lifetime, and is 0.03 to 1.70 mol, preferably 0.3 to 1.4 mol converted to MnO with respect to 100 mol of main component. When content of Mn oxide is too small, it becomes hard to obtain the effect of adding and when too much, relative dielectric constant tends to decrease.

Mainly, Y oxide shows the effect of improving IR lifetime and is 0.05 to 0.5 mol, preferably 0.085 to 0.48 mol converted to $Y_2O_3$ with respect to 100 mol of main component. When content of Y oxide is too small, it becomes hard to obtain the effect of adding and IR lifetime tends to deteriorate. When content of Y oxide is too much, sintering character tends to deteriorate.

Mainly, V oxide shows the effect of improving IR lifetime and is 0.007 to 0.4 mol, preferably 0.01 to 0.27 mol converted to $V_2O_5$ with respect to 100 mol of main component. When content of V oxide is too small, the effect of adding tends to become insufficient and when too much, IR remarkably tends to deteriorate.

Si oxide is a helping medium to assist sintering and is 0 to 0.5 mol (preferably not including 0 mol), preferably 0 to 0.4 mol (preferably not including 0 mol) converted to $SiO_2$ with respect to 100 mol of main component. When content of Si oxide is too much, relative dielectric constant tends to decrease.

Also, as subcomponent, it is preferable to further include W oxide. W oxide has the effects to even up the capacitive temperature characteristic when at above Curie temperature and to improve IR lifetime. W oxide is preferably 0.005 to 0.3 mol, more preferably 0.01 to 0.20 mol converted to $WO_3$ with respect to 100 mol of main component. When content of W oxide is too small, it becomes hard to obtain the effect of adding and when too much, IR remarkably tends to deteriorate.

Further, in the present specification, each oxide composing main component and each subcomponent is shown by stoichiometry composition, however, oxidation state of each oxides can be out of the stoichiometry composition provided that ratio of each subcomponent is found by converting metal quantity included in the oxide composing each subcomponent to the oxide of abovementioned stoichiometry composition.

The thickness of dielectric layer 2 is not particularly limited but preferably 6.0 μm or less per a layer, more preferably 4.5 μm or less and the most preferably 3.5 μm or less. The minimum of thickness is not particularly limited but such as 0.5 μm or so.

The number of laminated layer of dielectric layer 2 is not particularly limited but preferably 20 or more, more preferably 50 or more, the most preferably 100 or more. The maximum number of the laminated layer is not particularly limited but such as 2000 or so.

According to the present embodiment, even when the thickness of dielectric layer 2 is made thinner as 4.5 μm or less, multilayer ceramic capacitor having low IR defect rate and high relative dielectric constant can be obtained.

Average particle size of dielectric particles included in dielectric layer 2 is not particularly limited but, when the average particle size is R and the thickness of dielectric layer 2 is d, ratio (R/d) of average particle size R and the thickness of dielectric layer d is preferably 0.5<R/d<3, more preferably 0.5<R/d<1.5.

When the ratio (R/d) of average particle size R and the thickness of dielectric layer d is 0.5 or less, relative dielectric constant tends to decrease and when the ratio is 3 or more, IR defect rate tends to be high.

As present embodiment, by fixing the ratio (R/d) of average particle size R and the thickness of dielectric layer d as 0.5<R/d<3, the ratio of area where the number of dielectric particles between electrodes is 1 or 2 can be extended. And capacitance per volume of multilayer ceramic capacitor can be extended. Further, the number of dielectric particles between electrodes is the number of particles that perpendicular line of internal electrodes, drawn between two inner electrodes that are facing each other, passes through.

A conductive material included in the internal electrode layers 3 is not particularly limited however, for components of the dielectric layers 2 have reducing resisting property, base metals can be used. As the base metal to be used as a conductive material, Ni or Ni alloys are preferable. As the Ni alloys, an alloy of Ni and at least one kind of elements selected from Mn, Cr, Co and Al is preferable and a content of Ni in the alloys are preferably 95 wt % or more. Note that less than 0.1 wt % or so of P or other various trace constituents may be included in the Ni or Ni alloys. A thickness of the internal electrode layers 3 may be suitably determined in accordance with use, etc. but is normally 0.1 to 3 μm, particularly 0.2 to 2.0 μm or so is preferable.

A conductive material included in the external electrodes 4 is not particularly limited, but in the present invention, low priced Ni, Cu or alloys of these can be used. A thickness of the external electrode may be suitably determined in accordance with use, etc. but normally 10 to 50 μm or so is preferable.

A multilayer ceramic capacitor using dielectric ceramic composition of the present invention, in the same way as manufacturing conventional multilayer ceramic capacitor, is manufactured by preparing a green chip by a normal printing method or a sheet method using a paste, firing the same, printing or transferring an external electrode. Following is the manufacturing process concretely described.

First, dielectric ceramic composition powder included in dielectric layer paste is prepared and by making it a paint, dielectric layer paste is prepared.

The dielectric layer paste may be an organic-based paint comprising a mixture of a dielectric ceramic composition powder and an organic vehicle and may also be water-based paint.

As dielectric ceramic composition powder, the abovementioned oxides, their mixtures or their compound oxides can be used and further, it can suitably selected from various kinds of compounds becoming the abovementioned oxides or their compound oxides by firing such as carbonates, oxalates, nitrates, hydroxides, organic metals or their mixtures. The content of each compound in the dielectric ceramic composition may be determined so as to give the above composition of the dielectric ceramic composition after firing. Before making it a paste, the average particle size of dielectric ceramic composition powder is normally 0.1 to 1 μm or so.

The organic vehicle comprises a binder dissolved in an organic solvent. The binder used for the organic vehicle is not particularly limited, but may suitably be selected from ethyl cellulose, polyvinyl butyral, and other ordinary types of binders. Further, the organic solvent used is also not particularly limited and may suitably be selected from terpineol, butyl carbitol, acetone, toluene, and other organic solvents, etc. in accordance with the printing method, sheet method, or other method of use.

Further, when dielectric layer paste is a water-based paint, water-based vehicle comprises a water-based binder, dispersant, etc. dissolved in water and dielectric source material can be kneaded. The water-based binder is not particularly limited, but may suitably be selected from polyvinyl alcohol, cellulose, water-based acrylic resin, etc.

The internal electrode layer paste is prepared by kneading the electroconductive material comprising the above various types of electroconductive metals and alloys or various types of oxides becoming the above electroconductive materials after firing, an organic metal compound, resinate, etc. together with the above organic vehicle.

The external electrode paste is prepared in the same way as in the above internal electrode layer paste.

The content of the organic vehicle in the above each paste is not particularly limited and may fall within the usual amount, for example, the binder may be contained in the amount of 1 to 5 wt % or so and solvent 10 to 50 wt % or so. Further, the each paste may include, in accordance with need, various types of additives selected from dispersants, plasticizers, dielectrics, insulators, etc. The whole contents of these additives is preferably 10 wt % or less.

When using a printing method, the dielectric layer paste and the internal electrode layer paste are successively printed on the polyethylene terephthalate (PET) or other substrate, then cut into a predetermined shape, afterwhich the pastes are peeled off from the substrate to form a green chip.

Further, when using a sheet method, dielectric layer paste is used to form a green sheet, the internal electrode layer paste is printed on upper surface of this, after which these are stacked to form a green chip.

This green chip is processed to remove the binder before firing. Firing atmosphere for the green chip may suitably be determined in accordance with the type of electroconditive material in the internal electrode layer paste, but when using Ni or Ni alloys or other base metal as the electroconductive material, the oxygen partial pressure in the firing atmosphere is preferably $10^{-45}$ to $10^5$ Pa. When oxygen partial pressure is lower than the above-mentioned range, the effect of the removing binder process declines, and when higher, the internal electrode tends to become oxidized.

Further, as the other conditions for removing the binder, temperature raising rate is preferably 5 to 300° C./hour, more preferably 10 to 100° C./hour, a holding temperature is preferably 180 to 400° C., more preferably 200 to 350° C., and a temperature holding time is preferably 0.5 to 24 hours, more preferably 2 to 20 hours. Moreover, firing is preferably performed under general or reduced atmosphere wherein gas in the reduced atmosphere is preferably a wet mixed gas of $N_2+H_2$.

Firing atmosphere for the green chip may be suitably determined in accordance with the type of electrocondictive material in the internal electrode layer paste, but when using Ni or Ni alloys or other base metal as the electroconductive material, the oxygen partial pressure in the firing atmosphere is preferably $10^{-9}$ to $10^{-4}$ Pa. When oxygen partial pressure is lower than the abovementioned range, the electroconductive material of this internal electrode tends to become abnormally sintered and break in the middle, and when higher, the internal electrode tends to become oxidized.

Further, the holding temperature at firing is preferably 1100 to 1400° C., more preferably 1200 to 1300° C. When the holding temperature is lower than the abovementioned range, the densification tends to become insufficient, while when higher, there is a tendency toward breaking of the electrodes due to abnormal sintering in the internal electrode, deterioration of the capacity-temperature characteristic due to dispersion of the internal electrode material or reduction of dielectric ceramic composition.

The firing conditions other than the above conditions are that preferably, the temperature raising rate is preferably, 50 to 500° C./hour, more preferably, 200 to 300° C./hour, a temperature holding time is preferably, 0.5 to 8 hours, more preferably, 1 to 3 hours, and the cooling rate is preferably, 50 to 500° C./hour, more preferably, 200 to 300° C./hour. The firing atmosphere is desirable to be reducing atmosphere and as the atmosphere gas, it is preferable to use, for instance, a wet mixed gas of nitrogen gas and hydrogen gas.

After firing in the reducing atmosphere, the fired body of capacitor element is preferably anneal treated. The annealing is a treatment that re-oxidizes dielectric layer and this enables the IR lifetime to increase and, as a result, improve reliability.

In annealing atmosphere, the oxygen partial pressure is preferably $10^{-3}$ Pa or more, more preferably, $10^{-2}$ to 10 Pa. When oxygen partial pressure is lower than the abovementioned range, re-oxidation of the dielectric layers is difficult, while when higher, the internal electrode layers tends to become oxidized.

The holding temperature at the time of annealing is 1100° C. or less, more preferably 500 to 1100° C. When the holding temperature is lower than the abovementioned range, oxidation of the dielectric layers become insufficient that IR tends to deteriorate and its IR lifetime short. On the other hand, when the holding temperature is higher than the abovementioned range, not only do the internal electrode oxidize and the capacitance fall, but also ends up reacting with the dielectric component resulting in a tendency toward deterioration of the capacity-temperature characteristic, the IR and IR lifetime. Note that the annealing may be composed of only a temperature raising process and a temperature reducing process. In this case, the temperature holding time is zero and the holding temperature is synonymous with the maximum temperature.

The conditions other than the above conditions in annealing are that the temperature holding time is preferably, 0 to 20 hours and more preferably, 2 to 10 hours, the cooling rate is preferably, 50 to 500° C./hour and more preferably, 100 to 300° C./hour. Note that for annealing atmospheric gas, preferably a wet nitrogen gas is used.

Further, at abovementioned removing binder treatment, firing and annealing, to wet nitrogen gas or mixed gas, a wetter, etc. may be used. In this case, the temperature of the water is preferably 5 to 75° C. Moreover, the removing binder treatment, firing, and annealing may be performed consecutively or independently.

The thus obtained capacitor element body is, for instance, end polished using barrel polishing or sandblasting etc., then printed or transferred with an external electrode paste and fired to form the external electrodes 4. The firing conditions of the external electrode paste are, for instance, preferably 600 to 800° C. for 10 minutes to 1 hour or so in a wet mixed gas of nitrogen or hydrogen. Further, in accordance with need, the surfaces of the external electrodes 4 may be formed with a covering layer (pad layer) using plating techniques, etc.

Thus manufactured multilayer ceramic capacitor according to the present invention is assembled to a printed plate by soft soldering and used for all kinds of electronic equipment.

According to the present invention, by including Mg atom in main component and making the ratio of Ca and Mg in the main component within the predetermined range, even when the thickness of ceramic capacitor is made thinner, IR defect rate can be lowered and relative dielectric constant can be higher. Further, detail cause of the decline in IR defect rate by determining dielectric ceramic composition as mentioned above is unknown, however, it may be a factor that reducing-resistant property of dielectric ceramic composition improves by Mg atom additives in main component.

Above is a description of embodiments of the present invention, however, note that present invention is not limited to the abovementioned embodiments and may be modified in various ways within the scope of the invention.

For instance, in the abovementioned embodiments, illustration was made of a multilayer ceramic capacitor as the electronic device according to the present invention, but the electronic device according to the present invention is not limited to a multilayer ceramic capacitor and may be any device having dielectric layer composed of a dielectric ceramic composition of the above composition.

EXAMPLES

Below are concrete examples for the preferred embodiment of the present invention describing the invention further in detail. However, the present invention is not limited by the examples.

Example 1

Dielectric oxide having a main component of $\{\{Ba_{(1-x)}Ca_x\}O\}_A\{Ti_{(1-y-z)}Zr_yMg_z\}_BO_2$ was manufactured by sol-gel synthesis making the contents of symbols x and z, showing the composition rates, as stated in tables 1 and 2. And the contents of other symbols A, B and y were made as following; A/B=0.989 to 1.004 and y=0.16. Further, the samples of the present embodiment were A/B=0.995 to 1.004.

Further, as subcomponent, with respect to 100 mol of the main component, 0.4 mol of MnO, 0.3 mol of $Y_2O_3$, 0.04 mol of $V_2O_5$, 0.08 mol of $WO_3$ and 0.8 mol of $SiO_2$ were wet-grinded for 20 hours by ball mill. Then, the mixture was fired in atmosphere at 900° C. for 4 hours and the obtained fired material was subjected to wet grinding by ball mill for 20 hours and added as a subcomponent. Then, the main component and the subcomponent were subjected to wet grinding for 19 hours by ball mill and then dried to obtain dielectric materials of samples 1 to 32 shown in tables 1 and 2.

By the use of each dielectric materials of samples 1 to 32, 100 parts by weight of dielectric source material, 5.0 parts by weight of acrylic resin, 2.5 parts by weight of butyl benzyl phthalate, 6.5 parts by weight of mineral spirits, 4.0 parts by weight of acetone, 20.5 parts by weight of trichloroethane and 41.5 parts by weight of methylene chloride were mixed by ball mill to make a paste and dielectric layer paste was obtained.

Then, 44.6 parts by weight of Ni particles, 52 parts by weight of terpineol and 3 parts by weight of ethyl cellulose, 0.4 parts by weight of benzotriazole were kneaded using a triple-roll and internal electrode layer paste was obtained by slurrying them.

With the use of the obtained paste, a multilayer ceramic capacitor chip 1 as shown in FIG. 1 is manufactured as following.

With the use of the obtained dielectric layer paste, green sheet was formed on a PET film. Then internal electrode layer paste was printed on this, and the sheet was peeled off from the PET film. Next, the thus obtained green sheets and protection green sheet (on which the internal electrode layer paste was not printed) were layered, adhered by means of pressure to prepare a green chip.

Then the green chip was cut to a predetermined size and was processed to remove the binder, fire and anneal under the following condition and obtained a multilayer ceramic fired body. The removing binder treatment was performed under conditions of a temperature raising rate of 30° C./hour, a holding temperature of 260° C., a temperature holding time of 8 hours, and in air atmosphere. And firing conditions were a temperature raising rate of 200° C./hour, a temperature holding time of 2 hours, a cooling rate of 300° C./hour and in an atmosphere of a wet mixed gas of $N_2+H_2$ (oxygen partial pressure was $10^{-2}$ Pa). Holding temperatures of firing are shown in Tables 1 and 2.

The annealing conditions were a temperature raising rate of 200° C./hour, a holding temperature of 1000° C., a temperature holding time of 2 hours, a cooling rate of 300° C./hour, and in an atmosphere of a wet $N_2$ gas (oxygen partial pressure was $10^{-1}$ Pa). Note that at the time of firing and annealing, for wetting the atmosphere gasses, a wetter having a water temperature of 5 to 75° C. was used.

Then after the end faces of the obtained multilayer ceramic fired body were polished by sandblasting, In-Ga as external electrode was applied and samples 1 to 32 of multilayer ceramic capacitors of FIG. 1 were obtained.

The size of the thus obtained capacitor samples was 3.2 mm×1.6 mm×0.6 mm, the number of dielectric layers sandwiched by the internal electrode layers were 4 and their thickness was 3.0 µm, and the thickness of the internal electrode layers was 1.2 µm. Further, the average particle size of each sample was 2.5 µm. Ratio (R/d) of the average particle size (R) and the thickness of the dielectric layer (d) was 0.83.

Further, measurement method for the thickness of dielectric layer was as follows. First, the obtained capacitor sample was cut at a plane perpendicular to internal electrode, then SEM picture of the cut plane was taken. Next, on the SEM picture, the perpendicular line of the internal electrode was drawn and the length between an internal electrode and the next internal electrode that are facing each other was measured. The above process was repeated for 20 times and the mean value was determined to be thickness of the dielectric layer.

Further, as a measurement method of an average particle size of dielectric particles, it is calculated from the above-mentioned SEM picture, with the code method, by supposing that the dielectric particles are globular form. The coverage of SEM was 23 µm×30 µm. Each particle size of 80 particles per each sample was calculated and the mean value was determined to be an average particle size.

Relative dielectric constant and IR resistance of the obtained each capacitor sample was measured by following method.

Relative Dielectric Constant (ε r)

Capacitance (C) and dielectric loss (tan δ) were measured at standard temperature of 20° C. by a digital LCR meter (4274A, YHP made) under conditions of a frequency 120 Hz, and an input signal level (a measurement voltage) of 1.0 Vrms/µm. Then relative dielectric constant (no unit) was calculated from the obtained capacitance.

Relative dielectric constant (ε r) is an important characteristic to manufacture a small sized capacitor with high dielectric constant. In this example, the value of relative dielectric constant (ε r) is a mean value of the measured values of capacitor samples n=10. It is preferable for the relative dielectric constant to be high. The results are shown in tables 1 and 2.

Insulation Percent Defective

Insulation resistance (IR) was measured by the insulation tasting set (R8340A, Advantest made), under conditions of 20° C. and DC20V after impressing the capacitor samples for 60 seconds.

After the measurement, samples of insulation resistance of (IR) of $1.0 \times 10^{10}$ Ω or less were determined to be inferior goods and the rate of forming the inferior goods is shown in tables by the unit of %. The smaller the value is, the lower the IR defect rate is, namely, the higher the rate of forming the good products is. The results are shown in Tables 1 and 2.

TABLE 1

| Sample No. | | x (Ca content) | z (Mg content) | Relative Dielectric Constant | IR Percent Defective | Decision | Firing Temperature |
|---|---|---|---|---|---|---|---|
| 1 | Comp. Ex. | 0.01 | 0 | 20020 | 80 | X | 1240 |
| 2 | Comp. Ex. | 0.08 | 0 | 14000 | 80 | X | 1240 |
| 3 | Comp. Ex. | 0.005 | 0.0001 | 21324 | abnormal particle growth | X | 1240 |
| 4 | Comp. Ex. | 0.01 | 0.0001 | 19345 | 80 | X | 1240 |
| 5 | Ex. | 0.0001 | 0.0005 | 19567 | 35 | ◯ | 1240 |
| 6 | Ex. | 0.005 | 0.0005 | 19234 | 30 | ◯ | 1240 |
| 7 | Ex. | 0.01 | 0.0005 | 18245 | 30 | ◯ | 1240 |
| 8 | Ex. | 0.05 | 0.0005 | 17651 | 30 | ◯ | 1240 |
| 9 | Comp. Ex. | 0 | 0.001 | 19865 | abnormal particle growth | X | 1240 |
| 10 | Ex. | 0.0001 | 0.001 | 19002 | 15 | ◯ | 1240 |
| 11 | Ex. | 0.005 | 0.001 | 18700 | 15 | ◯ | 1240 |
| 12 | Ex. | 0.01 | 0.001 | 17029 | 15 | ◯ | 1240 |
| 13 | Ex. | 0.05 | 0.001 | 15671 | 15 | ◯ | 1240 |
| 14 | Ex. | 0.06 | 0.001 | 13233 | 15 | ◯ | 1240 |
| 15 | Comp Ex. | 0 | 0.003 | 17890 | abnormal particle growth | X | 1260 |
| 16 | Ex. | 0.0001 | 0.003 | 19007 | 0 | ◯ | 1240 |
| 17 | Ex. | 0.005 | 0.003 | 17533 | 0 | ◯ | 1240 |
| 18 | Ex. | 0.01 | 0.003 | 16090 | 0 | ◯ | 1240 |
| 19 | Ex. | 0.05 | 0.003 | 13245 | 0 | ◯ | 1240 |
| 20 | Ex. | 0.06 | 0.003 | 11903 | 0 | ◯ | 1240 |
| 21 | Ex. | 0.07 | 0.003 | 10090 | 0 | ◯ | 1240 |
| 22 | Comp. Ex. | 0.08 | 0.003 | 8900 | 0 | X | 1240 |
| 23 | Comp. Ex. | 0 | 0.01 | 15671 | abnormal particle growth | X | 1300 |
| 24 | Ex. | 0.0001 | 0.01 | 13430 | 0 | ◯ | 1260 |
| 25 | Ex. | 0.005 | 0.01 | 12200 | 0 | ◯ | 1260 |
| 26 | Ex. | 0.01 | 0.01 | 11231 | 0 | ◯ | 1260 |
| 27 | Ex. | 0.05 | 0.01 | 10590 | 0 | ◯ | 1260 |
| 28 | Ex. | 0.06 | 0.01 | 10050 | 0 | ◯ | 1260 |
| 29 | Comp. Ex. | 0.2 | 0.01 | 2231 | — | X | 1260 |
| 30 | Comp. Ex. | 0.005 | 0.012 | 9879 | 0 | X | 1280 |
| 31 | Comp. Ex. | 0.01 | 0.012 | 9007 | 0 | X | 1260 |
| 32 | Comp. Ex. | 0.05 | 0.012 | 9598 | 0 | X | 1280 |
| 33 | Comp. Ex. | 0.01 | 0.015 | 8500 | 0 | X | 1300 |

Here, with respect to 100 mol of $\{\{Ba_{(1-x)}Ca_x\}O\}_A\{Ti_{(1-y-z)}Zr_yMg_z\}_BO_2$ wherein A/B=0.989 to 1.004 and y=0.16, 0.4 mol of MnO, 0.3 mol of $Y_2O_3$, 0.04 mol of $V_2O_5$, 0.08 mol of $WO_3$ and 0.8 mol of $SiO_2$ are included. "–" in the above table indicates not able to calculate.

Evaluation 1

Table 1 shows composition rate, firing temperature, relative dielectric constant and IR defect rate of samples 1 to 33 having the main component of $\{\{Ba_{(1-x)}Ca_x\}O\}_A\{Ti_{(1-y-z)}Zr_yMg_z\}_BO_2$ wherein the content of x, namely the amount of Ca, and the content of z, namely the amount of Mg, were varied. Further, samples with relative dielectric constant being 10000 or more and IR defect rate being less than 50% were considered to be good and the others to be not good. The results are shown in table 1.

TABLE 2

| Sample No. | | x (Ca content) | z (Mg content) | Relative Dielectirc Constant | IR Defect Rate | Decision | Firing Temperature |
|---|---|---|---|---|---|---|---|
| 1 | Comp. Ex. | 0.01 | 0 | 20020 | 80 | X | 1240 |
| 4 | Comp. Ex. | 0.01 | 0.0001 | 19345 | 80 | X | 1240 |
| 7 | Ex. | 0.01 | 0.0005 | 18245 | 30 | ◯ | 1240 |
| 12 | Ex. | 0.01 | 0.001 | 17029 | 15 | ◯ | 1240 |
| 18 | Ex. | 0.01 | 0.003 | 16090 | 0 | ◯ | 1240 |
| 26 | Ex. | 0.01 | 0.01 | 11231 | 0 | ◯ | 1260 |
| 31 | Comp. Ex. | 0.01 | 0.012 | 9007 | 0 | X | 1260 |
| 33 | Comp. Ex. | 0.01 | 0.015 | 8500 | 0 | X | 1300 |

Here, with respect to 100 mol of $\{\{Ba_{(1-x)}Ca_x\}O\}_A\{Ti_{(1-y-z)}Zr_yMg_z\}_BO_2$ wherein A/B=0.989 to 1.004 and y=0.16, 0.4 mol of MnO, 0.3 mol of $Y_2O_3$, 0.04 mol of $V_2O_5$, 0.08 mol of $WO_3$ and 0.8 mol of $SiO_2$ are included.

Figure 2:
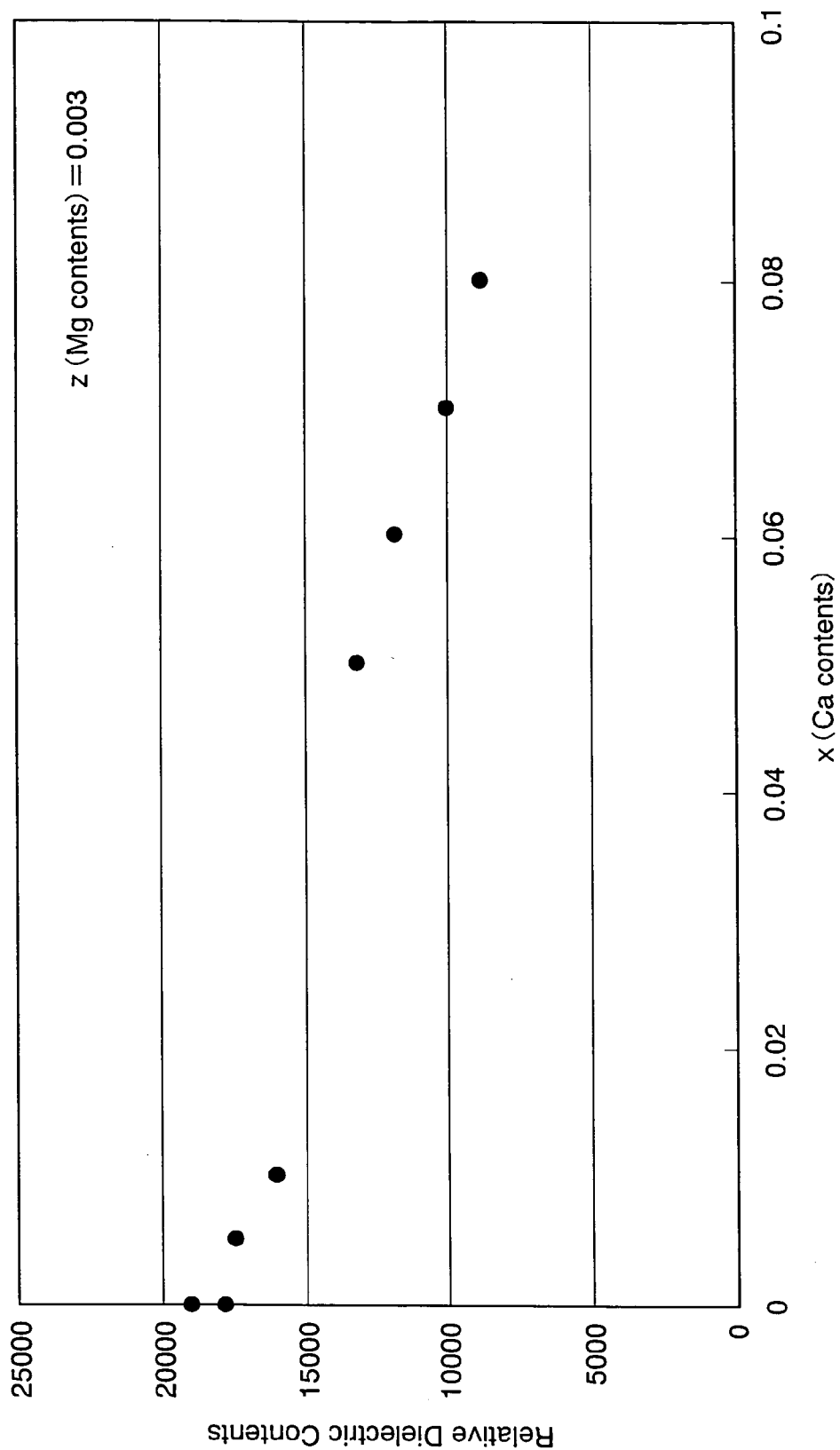
FIG. 2 is a graph showing the relation between the content of Ca in main component and relative dielectric constant.

Further, in FIG. 2, the relation between the content of x and the relative dielectric constant of samples 15 to 22 wherein the content of z is 0.003 are shown.

With regard to samples 5 to 29 of examples and comparative examples wherein each content of z is 0.0005, 0.001, 0.003 and 0.01 and x content is within the range of 0.0001 to 0.007, each showed 0 to 35% of IR defect rate and 10000 or more of relative dielectric constant which was determined to be good result. Further, from FIG. 2, it can be realized that the relative dielectric constant decreases when z content showing the amount of Mg is fixed and the x content showing the amount of Ca increases.

To the contrary, comparative examples 9, 15 and 23 wherein the content of x is 0 showed abnormal growth of particles in dielectric layer when firing. Samples 22 and 29 wherein the contents of x are 0.08 and 0.2 respectively showed relative dielectric constant less than 10000.

From the result, when the content of z is $0.0005 \leq z \leq 0.01$ and the content of x is $0.0001 \leq x \leq 0.07$, preferably $0.0001 \leq x \leq 0.05$, it was confirmed that the increase of IR defect rate can be limited showing high relative dielectric constant.

Samples 1 to 4 of comparative examples wherein the content of z is 0 or 0.0001, regardless of the content of x, IR defect rate became high such as 80% and when firing, abnormal growth of particles in dielectric layer was shown. From the result, it was confirmed that the content of z is preferably 0.0005 or more.

Samples 30 to 33 of comparative examples wherein the content of z is 0.012 or 0.015, regardless of the content of x, relative dielectric constant became less than 10000. From the result, it was confirmed that the content of z is preferably 0.01 or less.

Evaluation 2

Figure 3:
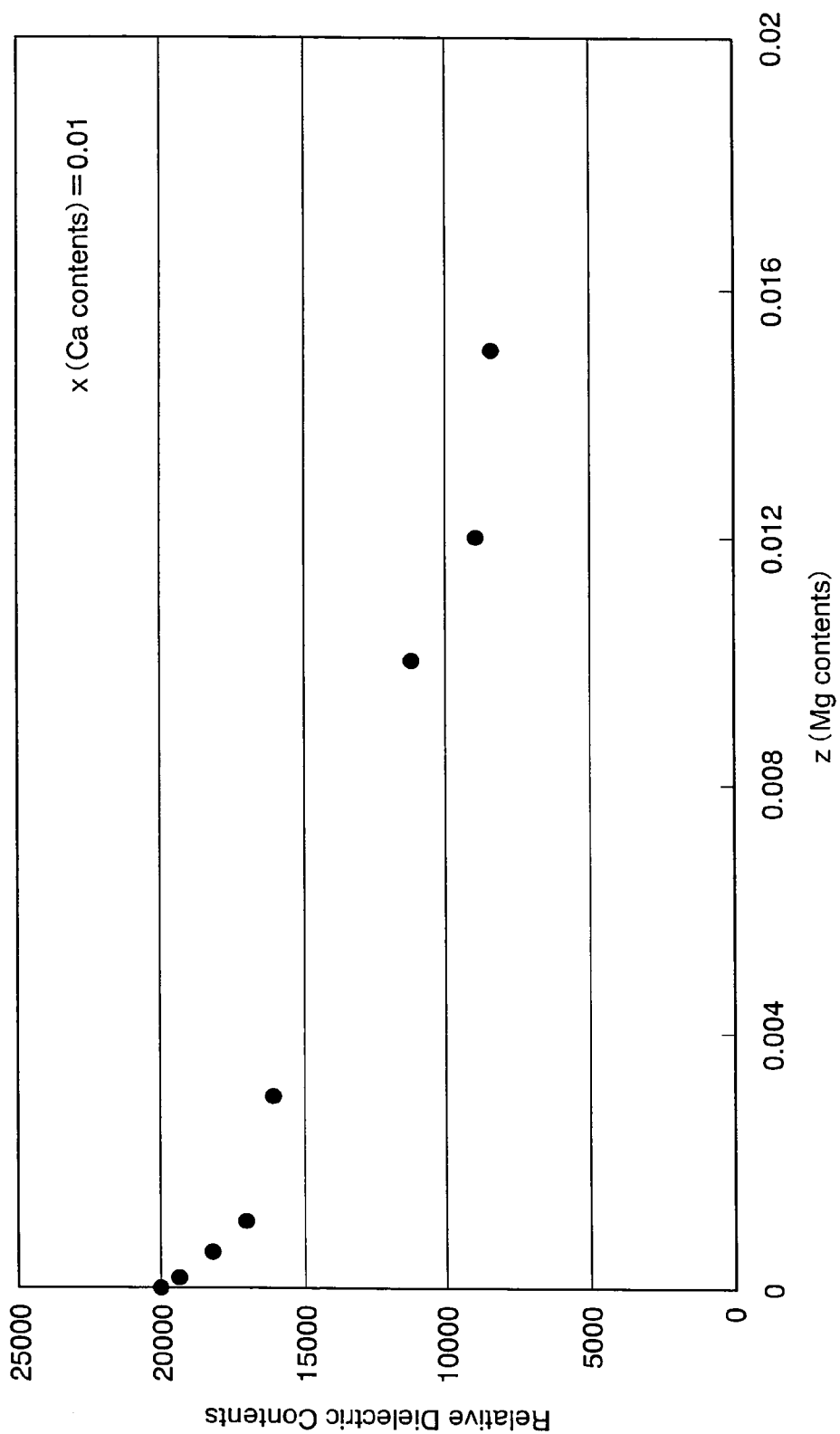
FIG. 3 is a graph showing the relation between the content of Mg in main component and relative dielectric constant.

Table 2 shows composition rate, firing temperature, relative dielectric constant and IR defect rate of samples wherein the content of x showing the amount of Ca was fixed to 0.001. Further, FIG. 3 shows the relation between the content of z and the relative dielectric constant for samples wherein the content of x was fixed as 0.001. And FIG. 4 shows the relation between the content of z and IR defect rate for samples wherein the content of x was fixed as 0.001.

Figure 4:
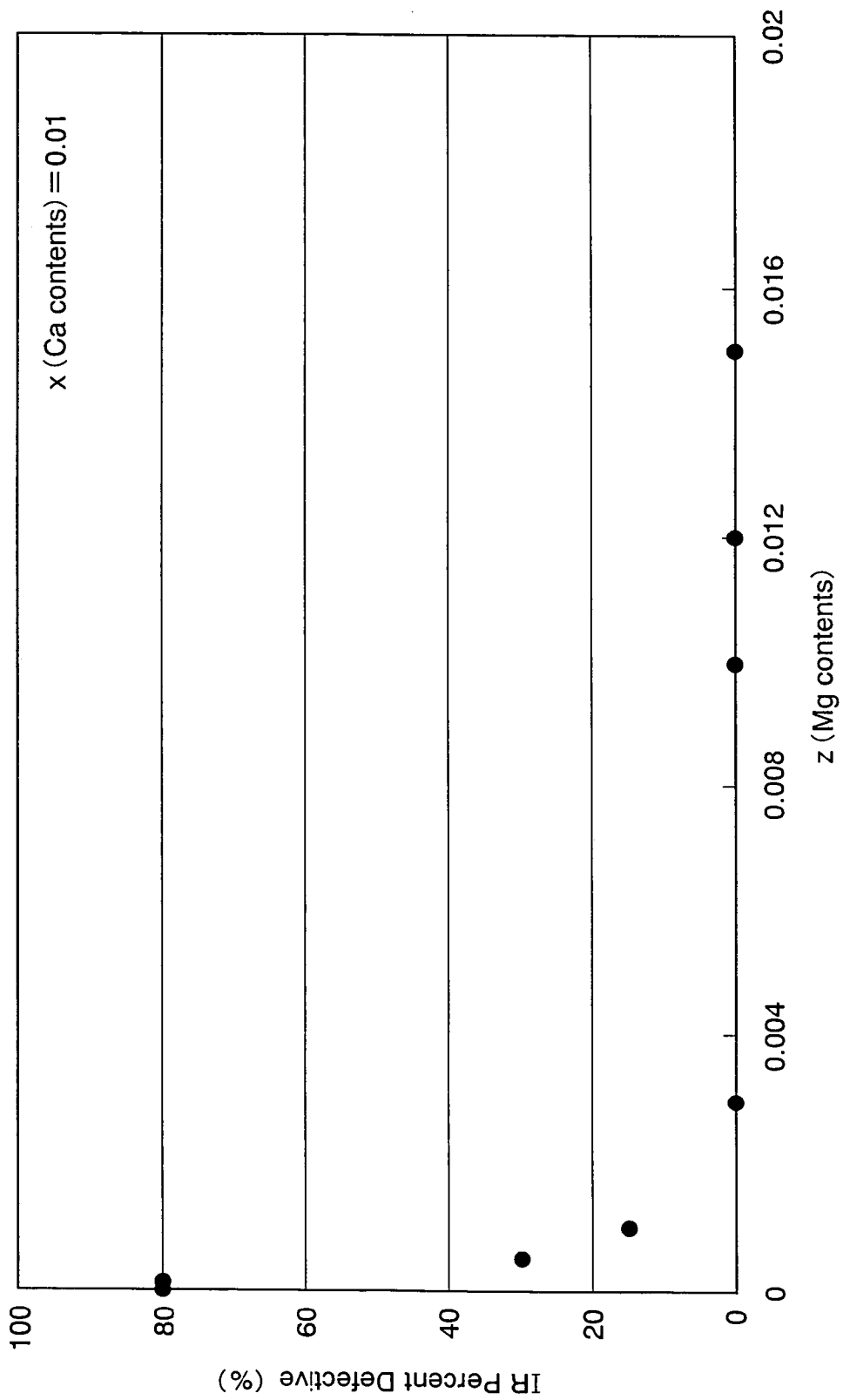
FIG. 4 is a graph showing the relation between the content of Mg in main component and IR defect rate.

When the x content showing the amount of Ca is predetermined, as the z content showing the amount of Mg increases, the relative dielectric constant decreases as shown in FIG. 3, and to the contrary, IR defect rate improves as shown in FIG. 4. Further, as shown in table 2, samples of examples wherein the content of z was 0.0005 to 0.01, both relative dielectric constant and IR defect rate showed good results, however, samples of comparative examples 1 and 4 wherein the content of z was 0 and 0.0001 respectively showed high IR defect rate such as 80%, also samples of comparative examples 31 and 33 wherein the content of z was 0.012 and 0.015 respectively showed relative dielectric constant of 10000 or less. From the result, it was confirmed that when the content of z is $0.0005 \leq z \leq 0.01$, preferably $0.003 \leq z \leq 0.01$, the increase of IR defect rate can be limited showing high relative dielectric constant.

Example 2

Capacitor samples of samples 34 to 41 as shown in table 3 were prepared in the same way as the samples in example 1 except $WO_3$ as oxide of W was not added. And in the same way as example 1, relative dielectric constant and IR defect rate can be measured.

TABLE 3

| Sample No. | | x (Ca content) | z (Mg content) | Relative Dielectirc Constant | IR Defect Rate | Decision | Firing Temperature |
|---|---|---|---|---|---|---|---|
| 34 | Comp. Ex. | 0 | 0.003 | 17950 | Abnormal particle growth | X | 1260 |
| 35 | Comp. Ex. | 0.0001 | 0.003 | 19113 | 0 | ○ | 1240 |
| 36 | Ex. | 0.005 | 0.003 | 17654 | 0 | ○ | 1240 |
| 37 | Ex. | 0.01 | 0.003 | 16293 | 0 | ○ | 1240 |
| 38 | Ex. | 0.05 | 0.003 | 13378 | 0 | ○ | 1240 |
| 39 | Ex. | 0.06 | 0.003 | 12005 | 0 | ○ | 1240 |
| 40 | Comp. Ex. | 0.07 | 0.003 | 10145 | 0 | ○ | 1240 |
| 41 | Comp. Ex. | 0.08 | 0.003 | 9003 | 0 | ○ | 1240 |

Here, with respect to 100 mol of $\{\{Ba_{(1-x)}Ca_x\}O\}_A\{Ti_{(1-y-z)}Zr_yMg_z\}_BO_2$ wherein A/B=0.989 to 1.004 and y=0.16, 0.4 mol of MnO, 0.3 mol of $Y_2O_3$, 0.04 mol of $V_2O_5$, 0.8 mol of $SiO_2$ are included.

Evaluation 3

Table 3 shows composition rate, firing temperature, relative dielectric constant and IR defect rate of capacitor samples 34 to 41 prepared in example 2. Further, each sample with relative dielectric constant being 10000 or more and IR defect rate being less than 50% were considered to be good and the others to be not good. The results are shown in table 3. And for each sample of example 2, the content of z, namely the amount of Mg was predetermined and the content of x, namely the amount of Ca was varied.

As shown in table 3, with regard to samples 35 to 40 of examples, without including the oxide of W as subcomponent and wherein the x content is within the range of 0.0001 to 0.007, each showed 0% of IR defect rate and 10000 or more of relative dielectric constant which was determined to be good result.

To the contrary, sample 34 of comparative example wherein the content of x is 0 showed abnormal growth of particles in dielectric layer when firing and sample 41 wherein the content of x is 0.08 showed relative dielectric constant less than 10000.

From the result, it was confirmed that the following object of the present invention could be achieved: to limit the increase of IR defect rate and show high relative dielectric constant when making dielectric layer thinner even without containing the oxide of W.

TABLE 4

| x (Ca content) | z (Mg content) | WO₃ 0.08 mol | | WO₃ none | |
|---|---|---|---|---|---|
| | | Sample No. | Relative Dielectric Constant | Sample No. | Relative Dielectric Constant |
| 0.0001 | 0.003 | 16 | 19007 | 35 | 19113 |
| 0.005  | 0.003 | 17 | 17533 | 36 | 17654 |
| 0.01   | 0.003 | 18 | 16090 | 37 | 16293 |
| 0.05   | 0.003 | 19 | 13245 | 38 | 13378 |
| 0.06   | 0.003 | 20 | 11903 | 39 | 12005 |
| 0.07   | 0.003 | 21 | 10090 | 40 | 10145 |

Evaluation 4

The content of x and z and relative dielectric constant for samples 16 to 21 wherein oxide of W is included and the same for samples 35 to 40 wherein oxide of W is not included are shown in table 4.

As shown in table 4, a sample with the oxide of W and a sample without the oxide of W showed approximately the same relative dielectric constant. However, the samples 16 to 21 with the oxide of W showed 12 hours of IR lifetime (high-temperature loaded lifetime) but the samples 35 to 40 without the oxide of W showed 10 hours of IR lifetime. This showed the samples without the oxide of W had shorter IR lifetime than the samples with the oxide of W.

Further, IR lifetime (high-temperature loaded lifetime) will be of particular importance when making dielectric layer thinner and the method of measurement is as follows. The measurement of IR lifetime (high-temperature loaded lifetime) was done by keeping the capacitor sample 20V/µ at 180° C. with the direct voltage under the impressed condition. In the present example, the "lifetime" is defined as time from the start of impressing with direct voltage to when resistance value come down by one digit. This was measured with 10 capacitor samples and the mean value was considered as the lifetime.

With this result, it was confirmed that the object of the present invention can be achieved even without the oxide of W, however, in order to improve the IR lifetime (high-temperature loaded lifetime) and obtain multilayer ceramic capacitor with higher reliability it is preferable to include the oxide of W as subcomponent.

As shown in the present example, it was confirmed that, even when dielectric layer is made thinner to 4.5 µm or less, particularly 3.0 µm or less, with the inclusion of Mg in main component and by fixing the ratio of Ca and Mg within the rage defined above, multilayer ceramic capacitor with low IR defect rate and high relative dielectric constant can be obtained.

What is claimed is:

1. A dielectric ceramic composition including a main component expressed by a composition formula $\{\{Ba_{(1-x)}Ca_x\}O\}_A\{Ti_{(1-y-z)}Zr_yMg_z\}_BO_2$ wherein A, B, x, y and z are as follows: $0.995 \leq A/B \leq 1.020$, $0.0001 \leq x \leq 0.07$, $0.1 \leq y \leq 0.3$ and $0.0005 \leq z \leq 0.01$ and as subcomponent, with respect to 100 mol of the main component, 0.03 to 1.7 mol of Mn oxide converted to MnO, 0.05 to 0.5 mol of Y oxide converted to $Y_2O_3$, 0.007 to 0.4 mol of V oxide converted to $V_2O_5$ and 0 to 0.5 mol of Si oxide converted to $SiO_2$.

2. The dielectric ceramic composition as in claim 1 further including 0.005 to 0.3 mol of W oxide converted to $WO_3$ with respect to 100 mol of the main component.

3. An electronic device having dielectric layer composed of the dielectric ceramic composition as in claim 1.

4. A multilayer ceramic capacitor having capacitor element body in which dielectric layers and inner electrode layers are laminated alternately wherein said dielectric layers are composed of the dielectric ceramic composition as in claim 1.

5. The multilayer ceramic capacitor as in claim 4 wherein conductive material included in the inner electrode layer is Ni or Ni alloys.

6. The multilayer ceramic capacitor as in claim 5 wherein a number of laminated layer of the dielectric layer is 50 or more.

7. The multilayer ceramic capacitor as in claim 6 wherein a thickness of the dielectric layer is 4.5 µm or less.

8. The multilayer ceramic capacitor as in claim 7 wherein ratio (R/d) of average particle size (R) of dielectric particles composing the dielectric layer and thickness (d) of the dielectric layer is 0.5<R/d<3.

9. An electronic device having dielectric layer composed of the dielectric ceramic composition as in claim 2.

10. A multilayer ceramic capacitor having capacitor element body in which dielectric layers and inner electrode layers are laminated alternately wherein said dielectric layers are composed of the dielectric ceramic composition as in claim 2.

* * * * *